United States Patent [19]
Ishikawa et al.

[11] Patent Number: 4,871,245
[45] Date of Patent: Oct. 3, 1989

[54] SURGICAL MICROSCOPE

[75] Inventors: Tomonori Ishikawa, Tokyo; Takashi Fukaya, Ina; Toshiyuki Tsunoda, Sagamihara; Hiroshi Fujiwara, Tokyo, all of Japan

[73] Assignee: Olympus Optical Co., Ltd., Tokyo, Japan

[21] Appl. No.: 112,440

[22] Filed: Oct. 26, 1987

[30] Foreign Application Priority Data

Oct. 27, 1986 [JP] Japan ................................ 61-255474

[51] Int. Cl.⁴ ....................... G02B 21/36; G02B 21/06
[52] U.S. Cl. ..................................... 350/502; 350/526
[58] Field of Search ............... 350/502, 523, 525, 526, 350/527, 174, 172

[56] References Cited

U.S. PATENT DOCUMENTS

| | | | |
|---|---|---|---|
| 1,825,229 | 9/1931 | Hase | 350/172 |
| 3,421,806 | 1/1969 | Weber | 350/527 |
| 4,057,318 | 11/1977 | Schindl | 350/502 |
| 4,232,933 | 11/1980 | Nakahashi | 350/502 |
| 4,302,087 | 11/1981 | Reinheimer et al. | 350/502 |
| 4,527,869 | 7/1985 | Nihoshi | 350/502 |
| 4,567,478 | 1/1986 | Schwab | 350/502 |
| 4,572,624 | 2/1986 | Schindl | 350/502 |

FOREIGN PATENT DOCUMENTS 259263 1/1968 Austria ................................ 350/525

*Primary Examiner*—Bruce Y. Arnold
*Assistant Examiner*—Terry S. Callaghan
*Attorney, Agent, or Firm*—Cushman, Darby & Cushman

[57] ABSTRACT

A surgical microscope arranging, so as to be insertable into and removable from an illuminating optical path for observation, a semi-transparent mirror capable of introducing illuminating light for photographing in a coaxial relation into illuminating light for observation or a totally reflecting mirror having such size as not to entirely interrupt the illuminating light for observation, in order to make it possible that compact size and low cost are attained, the amounts of illuminating light for observation and photographing are sufficiently secured, both the illuminating light are conducted along a common optical axis, and the illuminating light for observation is not interrupted even for a moment in photographing.

6 Claims, 4 Drawing Sheets

SURGICAL MICROSCOPE

BACKGROUND OF THE INVENTION

1. Field of the invention

The present invention relates to a surgical microscope and more particularly to a light source apparatus for surgical microscopes.

2. Description of the prior art

Recently, what is called microsurgery in which a delicate surgical operation is performed while a part to be operated upon is magnified and observed under a microscope, has been largely adopted. According to the microsurgery, from the fact that a delicate surgical operation is performed with accuracy, many favorable results have been achieved not only in ophthalmology, cerebral nerve surgery and otorhinology but also in various fields. Also in such microsurgery, it is necessary to photograph a part to be operated and an operating technique for education and study, as in other operations, and magnification photographing relying on a surgical microscope often brings about inevitably the lack of a sufficient amount of light. As a result, an Xe flash lamp (stroboscopic lamp) is used as an auxiliary light source for photographing and, in the past, various stroboscopic devices for surgical microscopes have been designed. Of these devices, the commonest one has a system that the Xe flash lamp is attached adjacent to a tube of the surgical microscope as illustrated in FIG. 1. That is to say, in FIG. 1, reference numeral 1 represents an objective tube section of the surgical microscope, in which an illuminating optical system for observation, an observing optical system and driving devices for these systems, not shown, are incorporated. Then, a light beam, incident on the objective tube 1, coming from a part to be operated is divided by a beam splitter, not shown, incorporated likewise in the objective tube 1 and an operation is performed in a such state that the one of the light beam travels to a photographing device 4 for photographing, while the other travels to an eyepiece 2 to be observed with an operator's eye 3. Reference numeral 7 indicated in broken lines represents, in an illustrating manner, an eye to be operated. For such an operation of the eye in ophthalmology, an illuminating device 5 including an optical axis B intersecting obliquely with an optical axis A of an objective lens 9 is mounted to the objective tube 1. The illuminating device 5 for illuminating the part to be operated has an Xe flash tube 5a as a light source for illumination and a lens 5b for condensing light emitted from the Xe flash tube 5a at the part to be operated.

In such an illuminating device 5 arranged obliquely in respect of the optical axis A, there has been a defect that, when an affected part to be operated which is narrow and deep in aperture, like an affected part 8a to be operated in otorhinology and cerebral nerve surgery shown in solid lines, is illuminated, illuminating light cannot completely reach the affected part 8a due to its oblique illumination and an illuminating effect is not brought about. To solve this problem, in the past, a method has been adopted that a direct suspension type illuminating device 6 is attached to the objective tube 1 in close vicinity to the objective lens 9 and the affected part 8a is illuminated, through the aperture of a cranium 8, by an Xe tube 6a placed in the direct suspension type illuminating device 6 and an objective lens 6b for illumination to condense light from the Xe tube 6a at the affected part. Also in the use of the direct suspension type illuminating device 6, however, it is necessary to extend its illuminating section in the vicinity of the optical axis A of the objective lens 9 and, as a result, a visual field for observing directly the part to be operated with the operator's naked eye has been obstructed. Further, it is limited to set the illuminating section near the optical axis A and, in fact, even the direct suspension type illuminating device 6 emits somewhat obliquely the illuminating light, with the result that the affected part 8a with a deep region is inevitably subjected to uneven illumination. Because the oblique illuminating device or the direct suspension type illuminating device is attached, in either case, to the outside of the objective tube 1 as mentioned above, a space necessary for an operator in the surgical operation would be blocked. Originally, a microscope for an assistant and other apparatus for operation are provided in the objective tube 1 of the surgical microscope, so that the operating space is made narrow, further by mounting the illuminating device for photographing, and the operator's operation would be disturbed.

In order to solve the above-mentioned problem, such a device as shown in FIG. 2 is thus disclosed in Japanese Utility Model Preliminary Publication No. Sho 60-31691, for example. That is to say, a microscopic tube 12 is coupled to a microscopic base arm (not shown) by a support arm 11. In the tube 12, a replaceable objective lens 22 is provided to change a focal distance depending on an operating manner or the depth of the affected part to be operated. Further, in the tube 12 is incorporated a light guide 18 comprising an optical fiber for supplying illuminating light for observation which continues to illuminate the affected part to be operated during the surgical operation and the illuminating light emitted from the light guide 18 is condensed by the objective lens 22 to illuminate the affected part. Reflecting light coming from the affected part to be operated traverses again the objective lens 22 and after passing through a magnification optical system 19 of a Galileo type binocular microscope optical system, is incident on a beam splitter 14. The light incident on the beam splitter 14 is reflected by a half transmitting surface 14b, is further reflected by a reflecting surface 14a and then is formed as an image on a film 13b through an image forming lens 13a of a photographing device 13 for photographing. On the other hand, light transmitting the half transmitting surface 14b of the beam splitter 14 is reflected from a reflecting surface 14c, is further reflected from a reflecting surface 15a of a reflecting optical member 15 of an eyepiece section and is last reflected by a reflecting surface 16a of another reflecting optical member 16 so as to enable the operator to observe the affected part to be operated through an eyepiece system 17. Also, the tube 12 incorporates an illuminating device 21 for photographing in a space between a driving device 20 of the magnification optical system 19 the objective lens 22. The illuminating device 21 for photographing comprises a socket 21a and a lamp house 21c which has an Xe lamp 21d and which is coupled to the socket 21a by a plug 21b and electric power for trigger and electric power for illumination are supplied from the socket 21a through the plug 21b. A shading plate 23 is interposed between the illuminating device 21 for photographing and the magnification optical system 19 so that light is not incident on the magnification optical system 19 from the Xe lamp 21d.

Also, in a retinal camera, it is a known system that the Xe lamp is arranged at a position optically conjugate with a light source for observation in an illuminating optical system for observation so that an illuminating optical axis for observation may coincide with an illuminating optical axis for photographing. In other words, as shown in FIG. 3, the system is such that a filament image of a light source lamp 34 for observation is formed at the center of an Xe lamp 33 through an illuminating optical system 36a and a field of operation is illuminated by an illuminating optical system 36b and an objective lens 32. Also, reference numeral 31 denotes a microscopic tube and 35 a magnification optical system.

In the device described in Japanese Utility Model Preliminary Publication No. Sho 60-31691, however, what is used as a measure for condensing a light beam from the Xe lamp 21d is only the objective lens 22. In addition, since the light beam emitted from the Xe lamp 21d is diverged and the focal distance of the objective lens 22 is 150–300 mm, whereas the Xe lamp 21d is placed at a distance of several tens of millimeters from the objective lens 22, its illuminating field is much widely enlarged as compared with a photographing region and consequently the amount of light reaching the photographing region is nothing but several percents of the total amount of light obtained from the Xe lamp 21d. Further, the illuminating field is more largely covered with the reduction of illumination as the focal distance of the objective lens 22 becomes longer and, at the same time, the numerical aperture of the observing optical system is reduced as the focal distance of the objective lens 22 becomes larger, so that the amount of light reaching a film surface becomes extremely small when the focal distance of the objective lens 22 is long. Since it is therefore required that the Xe lamp 21d has light-emitting energy of several hundreds of joules to secure the amount of light sufficient for photographing, there has been a problem that both the Xe lamp 21d and the light source section are inevitably used in large size and, as a result, the body of the microscope housing the Xe lamp 21d is also increased in size. Also, if the luminous intensity of the Xe lamp 21d is automatically controlled for the simplification of photographing, electric power to be supplied into the Xe lamp 21d becomes very high. In addition, with the surgical microscope, the distance between the objective lens and the affected part to be operated is widely different depending on a region to be operated and magnification for observation needs to be largely changed in accordance with the purpose of operation, so that the control of the luminous intensity with very high degree of accuracy is required, and there has been a problem that such a control circuit is substantially difficult to be realized. Furthermore, there is an indication of a problem that, since the optical axis of the Xe lamp is different from that of the illuminating light for observation, when the operation of a deep region is performed through a narrow aperture, the illuminating light for observation reaches the affected part to be operated, while on the other hand, the light of the lamp cannot pass through the aperture and therefore it may be impossible to take a photograph.

Also, in the device shown in FIG. 3, the optical axes of the illuminating light for observation and the light of the Xe lamp are arranged to be completely coaxial and the light from the Xe lamp 33 is condensed through the illuminating optical system 36b, with the result that the efficiency of the light intensity of the Xe lamp is markedly improved as compared with the device described in Japanese Utility Model Preliminary Publication No. Sho 60-31691. However, a problem has been encountered that, when the light beam of the light source lamp 34 passes through the Xe lamp 33, the amount of light is lost due to the surface reflection of the lamp 33 and a common amount of light for observation will be lacking.

Thus, as shown in FIG. 4, it has been devised that a free directional light deflecting device is arranged in the illuminating optical system for observation so that an optical system provided in the rear of the light deflecting device of the illuminating optical system for observation is used in common with the illuminating optical system for photographing and that the arrangement is made so that only one of both the illuminating optical systems is selected by the switching of the light deflecting device, the light from a light source for photographing is once converged, the optical axis of the illuminating light for observation completely coincides with that of the illuminating light for photographing and the light from the illuminating light source for observation is not blocked by that from the illuminating light source for photographing. That is, in FIG. 4, reference numeral 43 represents an Xe flash lamp, 44 a relay lens system, 45 a light source lamp, 46 a relay lens system, and 47 a leaping-up mirror provided to select either illuminating system relying on the light source lamp 45 or the Xe flash lamp 43. When the arrangement is made as mentioned above, the illuminating device for photographing securing a large amount of light can be constructed by means of the Xe flash lamp with low electric power which is substantially the same as a stroboscopic lamp for ordinary cameras, without the loss of the amount of light of the illuminating device for observation, and as such a small-sized and power-saving surgical microscope is available. Moreover, the illuminating light for observation is completely in a coaxial relation with respect to the illuminating light for photographing, so that it is possible to be photographed even in the surgical operation performed through a narrow aperture. Also, the electric power may be low even when the light intensity of the illuminating device for photographing is automatically controlled, and therefore the surgical microscope, which can employ a small-sized light intensity controlling device, can be materialized with ease and at a low cost. When the optical system is arranged as stated above, however, there has been a serious danger that since the leaping-up mirror 47 interlocks with the shutter of a camera to leap to a position 47' indicated in broken lines followed by the emission of light from the Xe flash lamp 43, the illuminating light is interrupted for a few seconds and, as a result, not only uneasiness is caused in the surgical operator's mind, but also operating time may be prolonged.

SUMMARY OF THE INVENTION

In view of the above problems, it is the object of the present invention to provide a surgical microscope with small size and a competitive price in which the amounts of the illuminating light for observation and photographing are sufficiently attained, both the illuminating light are introduced along a common optical axis, and the illuminating light for observation is not interrupted even for a moment during the photographing.

This object is accomplished, according to the present invention, by the arrangement that a light merging device which is insertable into and removable from an illuminating optical system for observation and which has a proper light distribution ratio is provided so that an optical system provided in the rear of the light merging device of the illuminating optical system for observation is used in common with an illuminating optical system for photographing and that the illuminating optical systems for observation and for photographing are used at the same time and either one is selected by the switching of the light merging device so that illuminating light for observation is completely in a coaxial relation with respect to illuminating light for photographing.

According to a preferred formation of the present invention, the light merging device comprises a rotatable semi-transmissive mirror which transmits the illuminating light for observation and reflects the illuminating light for photographing. The semi-transmissive mirror can be constructed as a leaping-up mirror driven by a rotary solenoid or a rotary mirror driven by a motor. This enables the objective tube to be reduced in size and photographing to be rapidly carried out.

According to another preferred formation of the present invention, an aperture stop is provided between a relay lens system and a magnification lens system in the illuminating optical system for observation, a totally reflecting mirror, capable of introducing the illuminating light for photographing into an illuminating optical path for observation, having an area smaller than the aperture at a position close to the aperture stop is provided, and this totally reflecting mirror is used as the light merging device. Thereby, a smaller-size objective tube and more rapid photographing are available.

This and other objects as well as the features and advantages of the present invention will be apparent from the following detailed description of the preferred embodiments when taken in conjunction with the accompanying drawings.

DESCRIPTION OF THE PREFERRED EMBODIMENTS

Figure 1:
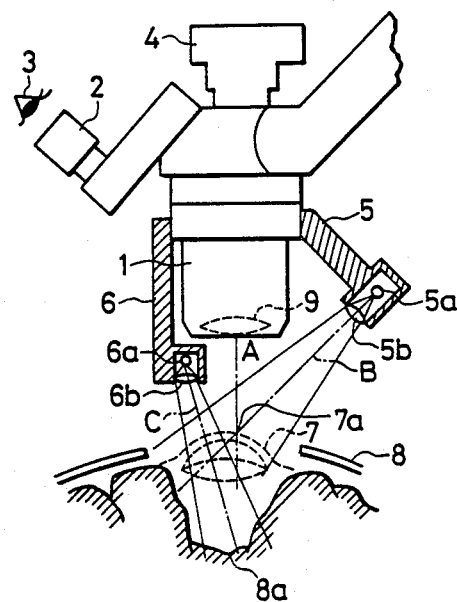
FIGS. 1 to 4 are views showing basic structure of the optical systems of conventional surgical microscopes different from each other.
Figure 2:
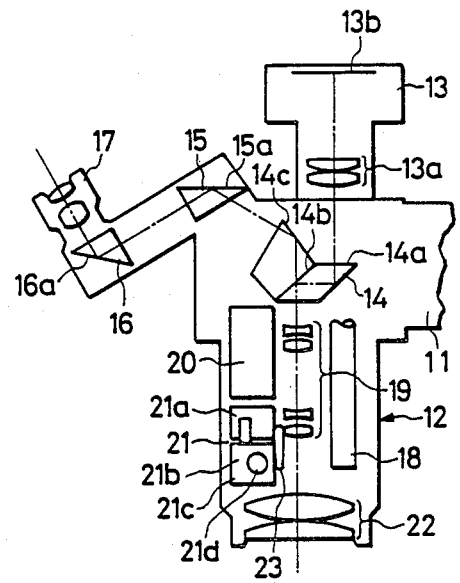
Figure 3:
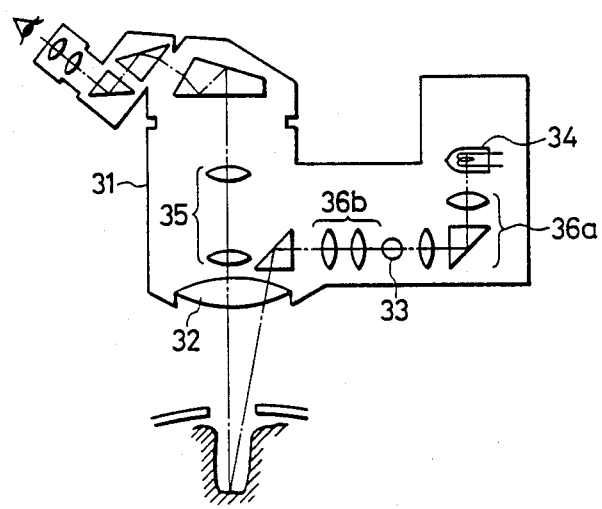
Figure 4:
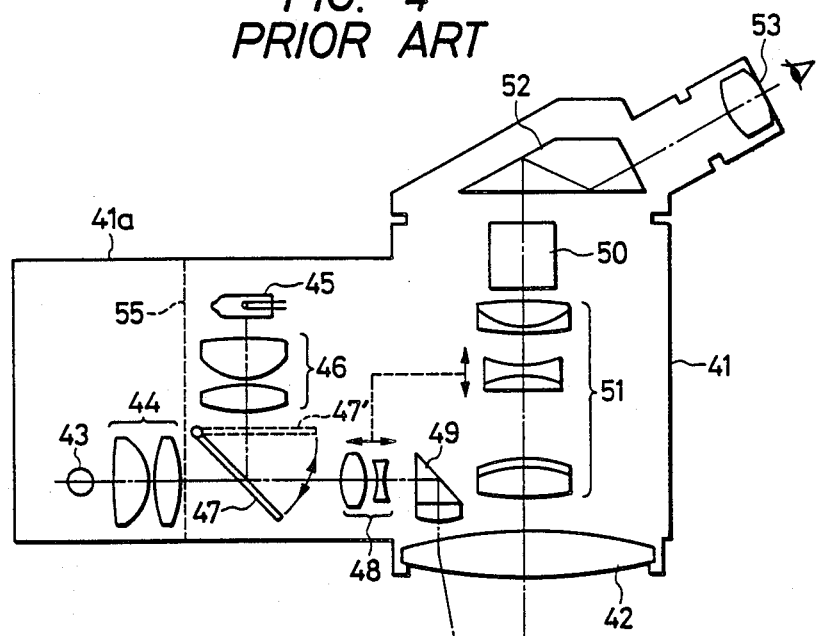

In accordance with the embodiments shown in the drawings, the present invention will be described in detail below.

Figure 5:
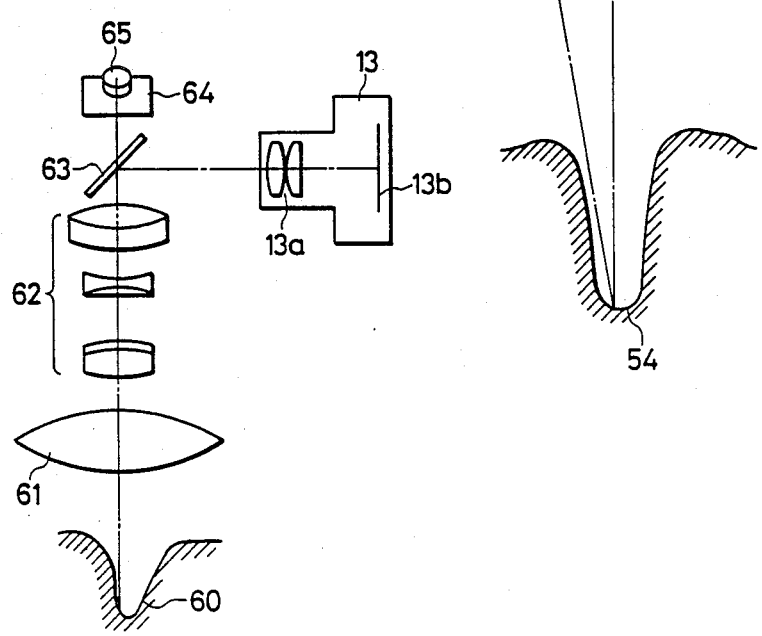
FIGS. 5 and 6 are basic structural views of the optical system of a first embodiment, viewed from sides different from each other, of the surgical microscope according to the present invention.
Figure 6:
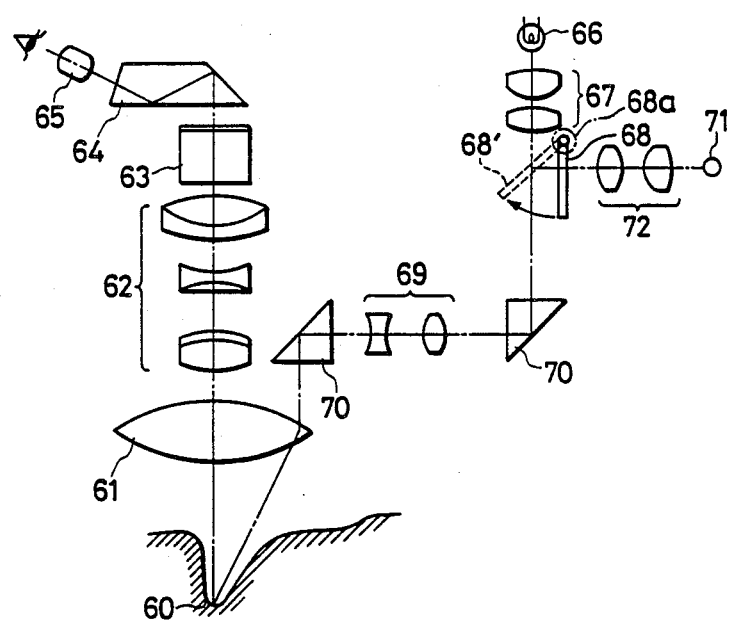

FIGS. 5 and 6 are basic structural views of the optical system of a first embodiment and FIG. 6 shows a side elevation viewed from the right side of FIG. 5 from which a photographing device is excluded. An affected part 60 to be operated is observed through an observing optical system comprising an objective lens 61, a magnification optical system for observation 62, a beam splitter 63, an observing prism 64 and an eyepiece 65. In such a case, the beam splitter 63 separates a photographing optical path from an observing optical path, as shown in FIG. 5, and conducts light to a film 13b through an image forming lens 13a of a photographing device 13. Also, as depicted in FIG. 6, an illuminating optical system for observation illuminating the affected part 60 to be operated comprises a light source lamp 66, a first relay lens 67, an illuminating magnification optical system 69, an illuminating prism 70 and the objective lens 61, and light emitted from the light source 66 illuminates the affected part 60 to be operated through the illuminating optical system for observation. On the other hand, an illuminating optical system for photographing includes an Xe flash lamp 71, a second relay lens 72, a semi-transmissive mirror 68 provided to be insertable into and removable from the illuminating optical system for observation, the illuminating magnification optical system 69, the illuminating prism 70 and the objective lens 61 and, in photographing, the semi-transmissive mirror 68 is leapt up to a position 68' indicated in a broken line by, for example, a rotary solenoid 68a, so that the light emitted by the Xe flash lamp 71 illuminates the affected part 60 through the illuminating optical system for photographing. In such an instance, the light source 66 and the Xe flash lamp 71 are disposed at optically conjugate positions. Further, the relation between the positions of the light source 66 and the Xe flash lamp 71 to the semi-transmissive mirror 68, shown in the drawing, is such that the illuminating light for observation is not lost in ordinary observation. Also, it is needless to say that the ratio of the reflection to the transmission of the semi-transmissive mirror 68 is selected to be fit to a light-emitting capacity of the Xe flash lamp 71.

As mentioned above, this embodiment has advantages that, because the illumination of the affected part 60 to be operated is selected from either the illumination for observation or the illumination for photographing by a leaping-up motion of the semi-transmissive mirror 68, a sufficient amount of illuminating light for observation can be secured, without any obstruction to the light in observation, the illuminating light for photographing which has been condensed forms a coaxial relation with the illuminating light for observation in photographing to be able to illuminate efficiently the affected part and that, because the illuminating light for observation traverses the semi-transmissive mirror 68 even in photographing, the illumination onto the affected part 60 is not blocked even for a moment. In addition, when the surgical microscope is used, a front-to-back dimension of the microscope offers little obstruction to the surgical operation and the thickness of the objective tube may rather cause troubles, so that the embodiment has also an advantage that the objective tube, in which the Xe flash lamp is not included, can be designed for small size.

Figure 7:
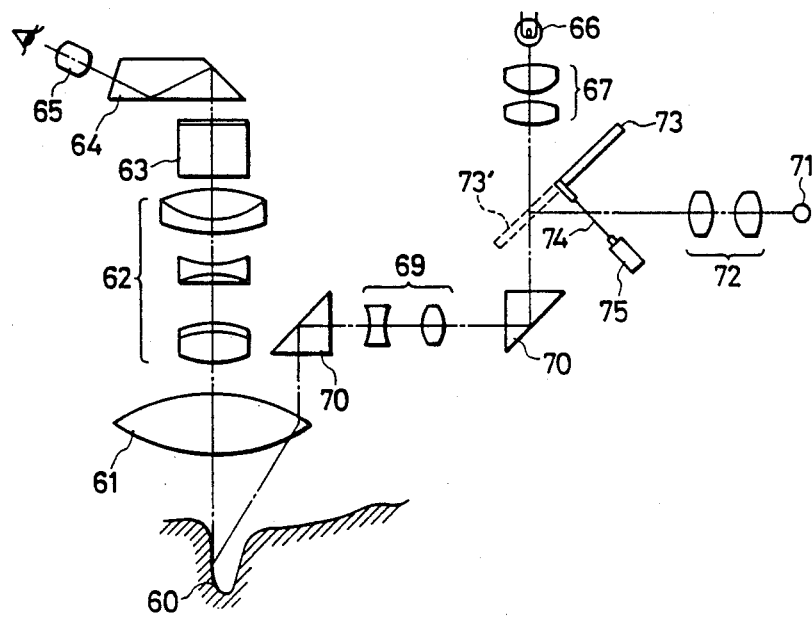
FIG. 7 is a basic structural view of the optical system of a second embodiment.

FIG. 7 is a schematic view of the optical system of a second embodiment. Since the second embodiment is the improvement of the first embodiment, the drawings and explanation relative to the same structure as in the optical system of the first embodiment are omitted. The illuminating optical system for photographing comprises the Xe flash lamp 71, the second relay lens 72, a semi-transmissive mirror 73, the illuminating magnification optical system 69, the illuminating prism 70 and the objective lens 61 and, in photographing, the semi-transmissive mirror 73 is rotated to a position 73' indicated in a broken line about a rotary shaft 74 by, for example, a motor 75, with the result that the light emitted from the Xe flash lamp 71 illuminates the affected part 60 to be operated through the illuminating optical system for photographing. When the semi-transmissive mirror 73 is rotated about the rotary shaft 74 held at a constant angle with respect to the optical axis of the second relay lens 72, as in the second embodiment, to be inserted into the illuminating optical path for observation, the arrangement makes it possible to instantaneously stop the mirror 73 and to emit the light from the Xe flash lamp 71 immediately after the stop of the mirror, which will be very effective.

Figure 8:
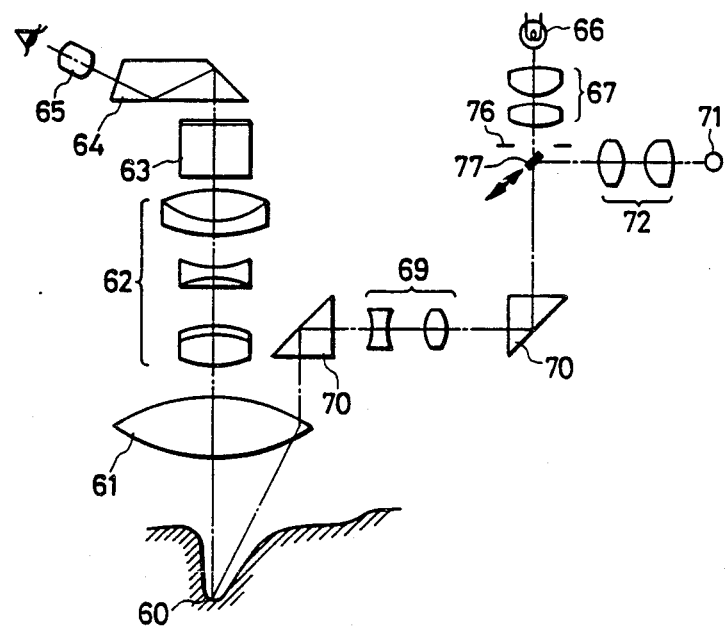
FIG. 8 is a basic structural view of the optical system of a third embodiment.

FIG. 8 is a schematic view of the optical system of a third embodiment, in which an aperture stop 76 is provided between the first relay lens system 67 and the illuminating magnification optical system 69 to arrange a totally reflecting mirror 77 having an area smaller than the aperture of the aperture stop 76 at a position close thereto and the same effect as in the first and second embodiments is brought about in such a manner that the illuminating light for photographing is introduced into the illuminating optical path for observation by means of such a structure as in the above embodiments. In this embodiment, there is an advantage that, from the fact that the totally reflecting mirror 77 can be constructed smaller, its inertia force caused by the shift is smaller as compared with the semi-transmissive mirrors 68, 73 of the above embodiments and therefore its driving and positioning works are easily carried out.

What is claimed is:

1. A surgical microscope comprising an objective lens, an illuminating optical system, an observing optical system, and a photographing optical system, the improvement comprising a light merging means capable of being selectively inserted, only during photographing, into an illuminating optical system for observation and an illuminating optical system for photographing so that part of illuminating light for observation and part of illuminating light for photographing are merged into a single light beam to be projected onto a region to be viewed through a common optical path.

2. A surgical microscope according to claim 1, wherein said light merging means comprises a rockable semi-transmissive mirror transmitting said illuminating light for observation and reflecting said illuminating light for photographing.

3. A surgical microscope according to claim 2, wherein said light merging means further comprises a rotary solenoid coupled to said semi-transmissive to rock said mirror.

4. A surgical microscope according to claim 1, wherein said light merging means comprises a semi-transmissive mirror capable of rotating within a plane making an angle of 45° with respect to an optical axis of said illuminating optical system for observation and an optical axis of said illuminating optical system for photographing.

5. A surgical microscope according to claim 4, wherein said light merging means further comprising a motor coupled to said semi-transmissive mirror to rotate said mirror.

6. A surgical microscope according to claim 1, further comprising an aperture stop arranged in an optical path between a relay lens system arranged in said illuminating optical system for observation and a magnification lens system arranged in said common optical path, said light merging means being comprised of a totally reflecting mirror arranged at a position close to said aperture stop and having an area smaller than the aperture of said aperture stop to be selectively insertable into either optical system.

* * * * *